UNITED STATES PATENT OFFICE.

PETER GROSBÉTY, OF NEOGA, ILLINOIS.

LOTION.

SPECIFICATION forming part of Letters Patent No. 411,657, dated September 24, 1889.

Application filed July 8, 1889. Serial No. 316,859. (No specimens.)

*To all whom it may concern:*

Be it known that I, PETER GROSBÉTY, of Neoga, in the county of Cumberland and State of Illinois, have invented a new and useful Improvement in Medical Compounds, of which the following is a specification.

My composition consists of the following ingredients, combined in the proportions stated, viz: spirits of camphor, one ounce; water of ammonia, one ounce; sulphate of zinc, ten grains; distilled water, four ounces; salt, three ounces.

In preparing the composition the first three elements are mixed by agitation and the last two elements mixed and added to the first, when the composition may be bottled for use.

The composition should be shaken before using and applied to the surface affected by pouring it thereon or by wetting a cloth or sponge and applying the latter to the surface affected.

The composition is efficacious in the treatment of chronic sores, skin eruptions, tetter, leprosy, scrofula, sick headache, and all skin diseases.

Having thus described my invention, what I claim as new is—

The herein-described lotion or composition of matter to be used in the treatment of diseases such as described, the same consisting of spirits of camphor, water of ammonia, sulphate of zinc, water, and salt, in about the proportions specified.

PETER GROSBÉTY.

Witnesses:
 E. F. KNIGHT,
 L. D. MCKEE.